*(12)* United States Patent
Tsuda et al.

(10) Patent No.: US 6,635,221 B1
(45) Date of Patent: Oct. 21, 2003

(54) METHOD OF RUST INHIBITION WITH THERMOSETTING FLUORINE-CONTAINING RESIN POWDER COATING COMPOSITION

(75) Inventors: Nobuhiko Tsuda, Settsu (JP); Ryuji Iwakiri, deceased, late of Settsu (JP), by Miyuki Iwakiri, legal representative; Ryoichi Fukagawa, Settsu (JP); Keisuke Tano, Settsu (JP); Daisuke Tanizawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/869,611

(22) PCT Filed: Oct. 4, 1999

(86) PCT No.: PCT/JP99/05459

§ 371 (c)(1),
(2), (4) Date: Jul. 2, 2001

(87) PCT Pub. No.: WO01/25354

PCT Pub. Date: Apr. 12, 2001

(51) Int. Cl.[7] .................................................. C23F 11/00
(52) U.S. Cl. ........................ 422/7; 428/407; 427/385.5; 427/388.1
(58) Field of Search .............................. 422/7; 428/407, 428/463; 427/385.5, 384, 388.1

(56) References Cited

U.S. PATENT DOCUMENTS 5,898,043 A * 4/1999 Uemae et al. .............. 523/204

FOREIGN PATENT DOCUMENTS

| JP | 4-277569 | 10/1992 |
|----|----------|---------|
| JP | 6-184243 | 7/1994 |
| JP | 6-299092 | 10/1994 |
| JP | 06-299092 | * 10/1994 |
| JP | 9-10672 | 1/1997 |

OTHER PUBLICATIONS

International Search Report for PCT/JP99/05459 dated Dec. 14, 1999.
English language translation of International Preliminary Examination Report for PCT/JP99/05459, dated May 9, 2000.

* cited by examiner

*Primary Examiner*—Robert J. Warden, Sr.
*Assistant Examiner*—Sean E. Conley
(74) *Attorney, Agent, or Firm*—Sughrue Mion, PLLC

(57) ABSTRACT

A method of inhibiting a base metal from rusting which comprises applying to the metallic base a thermosetting fluororesin powder coating composition containing substantially no chlorine. Thus, the metallic base can be effectively prevented from rusting. This method is especially useful for coating in coastal regions where salt damage is a problem, in the outdoors where acid rain causes damage, and in kitchens.

5 Claims, No Drawings

METHOD OF RUST INHIBITION WITH THERMOSETTING FLUORINE-CONTAINING RESIN POWDER COATING COMPOSITION

TECHNICAL FIELD

The present invention relates to a method of inhibiting rust from arising on a metallic substrate in case of coating the metallic substrate with a thermosetting fluorine-containing resin powder coating composition.

BACKGROUND ART

It is known that a coated article being excellent in weather resistance can be obtained by applying a thermosetting fluorine-containing resin powder coating composition on a metallic substrate (JP-B-6-104792, JP-A-6-345822, JP-A-6-184243, etc.).

Also it is described in JP-A-6-184243 that a fluorine-containing resin copolymer containing no chlorotrifluoroethylene is excellent particularly in yellowing resistance of a coating film at a weather resistance test.

As mentioned above, a priority has been given to characteristics of a coating film, and with respect to a relation between a substrate and a coating film, only adhesion between them has been taken up as a problem to be solved.

However though a substrate coated with a thermosetting fluorine-containing resin powder coating composition exhibits excellent gloss retention and a minimum change of color difference because of excellent weather resistance of the fluorine-containing resin, the composition has a problem with rust on a contact surface of a metallic substrate in outdoor use. Particularly when the fluorine-containing powder coating composition is directly coated on a metallic substrate to form a coating film without using a primer, rusting arises remarkably.

This problem with rusting of a metallic substrate coated with a thermosetting fluorine-containing resin powder coating composition has not yet been solved.

DISCLOSURE OF INVENTION

The present invention relates to the method of inhibiting rust of a metallic substrate by coating the metallic substrate with a thermosetting fluorine-containing resin powder coating composition which does not contain essentially chlorine atom.

BEST MODE FOR CARRYING OUT THE INVENTION

The thermosetting fluorine-containing resin powder coating composition to be used in the method of the present invention basically comprises a thermosetting fluorine-containing resin and a curing agent, the both of which contain no chlorine essentially.

Examples of the thermosetting fluorine-containing resin containing no chlorine are, for instance, copolymers which comprise a fluoroolefin unit containing no chlorine atom as an essential component and have a crosslinkable reactive group.

Examples of the fluoroolefin containing no chlorine atom are, for instance, tetrafluoroethylene, monofluoroethylene, trifluoroethylene, vinylidene fluoride, hexafluoropropylene, pentafluoropropylene, and the like. The fluoroolefin can be optionally selected depending on characteristics required on a coating film and a combination with other copolymer component and curing agent. Those fluoroolefins can be used in combination of two or more thereof. Particularly preferable fluoroolefins are perfluoroolefins such as tetrafluoroethylene and hexafluoropropylene from the viewpoint of copolymerizability with vinyl ether and/or vinyl ester monomers.

Examples of the crosslinkable reactive group of the thermosetting fluorine-containing resin to be used in the present invention are hydroxyl group, carboxyl group, amido group, amino group, mercapto group, glycidyl group, isocyanate group, and the like. Examples of a method for introducing such a crosslinkable reactive group into the copolymer are a method of copolymerizing monomer having a crosslinkable reactive group, a method of decomposing a part of the copolymer, a method of reacting a reactive group of the copolymer with a compound giving a crosslinkable reactive group thereto, and the like.

Examples of the comonomer which can introduce a suitable crosslinkable reactive group by copolymerization are, for instance, monomers having hydroxyl group or a group which can be converted to hydroxyl group and having a double bond copolymerizable with the fluoroolefin. Examples thereof are one or a mixture of two or more of hydroxyalkyl vinyl ethers such as hydroxyethyl vinyl ether, hydroxypropyl vinyl ether, hydroxybutyl vinyl ether, hydroxyisobutyl vinyl ether and hydroxycyclohexyl vinyl ether; esters of vinyl alcohol and hydroxyalkylcarboxylic acid such as vinyl hydroxyacetate, vinyl hydroxypropionate, vinyl hydroxybutyrate, vinyl hydroxyvalerate, vinyl hydroxyisobutyrate and vinyl hydroxycyclohexanecarboxylate; hydroxyalkyl allyl ethers such as hydroxyethyl allyl ether, hydroxypropyl allyl ether, hydroxybutyl allyl ether, hydroxyisobutyl allyl ether and hydroxycyclohexyl allyl ether; hydroxyalkyl allyl esters such as hydroxyethyl allyl ester, hydroxypropyl allyl ester, hydroxybutyl allyl ester, hydroxyisobutyl allyl ester and hydroxycyclohexyl allyl ester; hydroxyalkyl esters of acrylic acid or methacrylic acid such as 2-hydroxyethyl acrylate, hydroxypropyl acrylate, 2-hydroxyethyl methacrylate and hydroxypropyl methacrylate; partly fluorine-substituted compounds thereof; and the like. One or two or more thereof may be selected and used as a comonomer for introducing hydroxyl group.

Examples of the comonomer having carboxyl group are, for instance, α,β-unsaturated carboxylic acids such as acrylic acid, methacrylic acid, itaconic acid, succinic acid, succinic anhydride, fumaric acid, fumaric anhydride, crotonic acid, maleic acid and maleic anhydride and in addition, fluorine-substituted monomer such as perfluorobutenoic acid, and the like. Also examples of the comonomer having glycidyl group are, for instance, glycidyl (meth)acrylate, glycidyl vinyl ether, glycidyl allyl ether, and the like. Examples of the comonomer having amino group are, for instance, amino alkyl vinyl ether, amino alkyl allyl ether, and the like. Examples of the comonomer having amido group are, for instance, (meth)acrylamide, methylolacrylamide, and the like. Examples of the comonomer having nitrile group are, for instance, (meth)acryonitrile, and the like. Examples of the comonomer having isocyanate group are, for instance, vinyl isocyanate, isocyanate ethyl acrylate, and the like. It is particularly preferable to use a vinyl or allyl ether or ester compound as a comonomer for introducing a crosslinkable reactive group from the viewpoint of excellent copolymerizability with the fluoroolefin.

Example of the method for partly decomposing the copolymer is a method of copolymerizing a monomer having a hydrolyzable ester group after polymerization and then hydrolyzing the copolymer to generate carboxyl group in the copolymer. Also it is possible to form crosslinkage directly by transesterification in a curing reaction without carrying out ester hydrolysis mentioned above.

As the method for reacting the copolymer with a compound giving a crosslinkable reactive group thereto, for example, a method of introducing carboxyl group by reacting a divalent carboxylic acid anhydride such as succinic anhydride with a fluorine-containing copolymer having hydroxyl group, or the like method can be employed suitably.

In addition to the above-mentioned fluoroolefin unit and the unit having a crosslinkable reactive group, a comonomer copolymerizable with those two components can be copolymerized with the fluorine-containing copolymer to be used in the present invention in order to reduce a melting point or a glass transition temperature of the fluorine-containing copolymer for further enhancing workability at coating and imparting physical properties such as proper hardness, flexibility and gloss to the coating film. Example of such an optional comonomer to be used is one which has an unsaturated group being active so as to be copolymerizable with the fluoroolefin and does not lower weather resistance of the coating film remarkably.

Suitable examples of such an optional comonomer are ethylenically unsaturated compounds, for instance, alkyl vinyl ethers such as ethyl vinyl ether, propyl vinyl ether, butyl vinyl ether, isobutyl vinyl ether and cyclohexyl vinyl ether; esters of vinyl alcohol and alkylcarboxylic acid such as vinyl acetate, vinyl propionate, vinyl butyrate, vinyl isobutyrate, vinyl valerate, vinyl cyclohexanecarboxylate, vinyl benzoate and vinyl para-t-butylbenzoate; alkyl allyl ethers such as ethyl allyl ether, propyl allyl ether, butyl allyl ether, isobutyl allyl ether and cyclohexyl allyl ether; alkyl allyl esters such as ethyl allyl ester, propyl allyl ester, butyl allyl ester, isobutyl allyl ester and cyclohexyl allyl ester; alkenes such as ethylene, propylene, butylene and isobutylene; acrylic acid and methacrylic acid; esters of acrylic acid or methacrylic acid such as ethyl acrylate, propyl acrylate, butyl acrylate, isobutyl acrylate, 2-ethylhexyl acrylate, ethyl methacrylate, propyl methacrylate, butyl methacrylate, isobutyl methacrylate and 2-ethylhexyl methacrylate; partly fluorine-substituted compounds thereof; and the like. Those optional comonomers may be used solely or in combination of two or more thereof.

Among them, vinyl or allyl compounds or alkenes which are excellent in copolymerizability with the fluoroolefin are used preferably as the optional comonomer. In case of using vinyl or allyl alkyl esters or alkyl ethers, a linear, branched or alicyclic alkyl group having about 2 to about 10 carbon atoms can be suitably used as an alkyl group.

From the above-mentioned point of view, examples of the thermosetting fluorine-containing resin are, for instance, tetrafluoroethylene/cyclohexyl vinyl ether/isobutyl vinyl ether/hydroxybutyl vinyl ether copolymer, tetrafluoroethylene/isobutylene/hydroxybutyl vinyl ether copolymer, tetrafluoroethylene/ hexafluoropropylene/ ethylene/ hydroxybutyl vinyl ether copolymer, vinylidene fluoride/tetrafluoroethylene/perfluorobutenoic acid copolymer, and the like.

Thermosetting fluorine-containing resins which can be used suitably in the present invention are copolymers comprising a perfluoroolefin such as tetrafluoroethylene or hexafluoropropylene and a vinyl ether and/or vinyl ester as the essential components. When those resins are used, because of excellent adhesion and moisture permeability thereof, a high effect of preventing rust of the metallic substrate can be exhibited.

It is desirable that the thermosetting fluorine-containing resin to be used for the thermosetting powder coating composition of the present invention has a fluorine content of not less than 10% by weight. When the fluorine content is less than 10% by weight, a coating film having a sufficient weather resistance cannot be obtained.

Also it is desirable that a MFR of the thermosetting fluorine-containing resin is within a range of from 0.1 to 100 g/10 min when measured at 100° to 180° C. When the MFR measured at 100° C. of a low temperature side is less than 0.1 g/10 min, meltability of the resin at kneading with other additives such as a pigment is not sufficient, and color developing property, weather resistance and impact resistance of the obtained coating film are inferior. When the MFR measured at 180° C. of a high temperature side is larger than 100 g/10 min, a viscosity of the resin at melt-kneading is lowered and the melt-kneading is not sufficient, and thus color developing property, weather resistance and impact resistance of the obtained coating film are also inferior.

Further it is desirable that in the present invention, the thermosetting fluorine-containing resin has a glass transition temperature of from 45° to 120° C. When the glass transition temperature is less than 45°°C., there are problems that the obtained coating composition is agglomerated at coating or an amount of composition sticking on a pulverizer increases at a pulverization step, thereby lowering productivity. When exceeding 120°°C., melt-kneading property is lowered, thereby making it impossible to sufficiently disperse additives such as a pigment at the melt-kneading step.

In the present invention, from the viewpoint of prevention of corrosion and enhancement of weather resistance, it is preferable to solely use the above-mentioned thermosetting fluorine-containing resin containing no chlorine as a resin component of the coating composition.

As a curing agent, those which have been used for thermosetting powder coating compositions can be used. Examples thereof are, for instance, a blocked isocyanate compound, acid anhydride, polyamine compound, glycidyl compound, isocyanurate compound, polybasic acid, and the like.

In addition, various additives which are usually used for powder coating compositions, for example, a pigment, filler, ultraviolet ray absorber, leveling agent, flowability control agent, antioxidant, heat deterioration preventive agent, gloss control agent, static charge control agent, foam preventing agent, and the like may be blended optionally. It is preferable that those third components do not contain chlorine.

Examples of the pigment are, for instance, one or two or more of inorganic pigments such as titanium dioxide, iron oxide red, yellow iron oxide and carbon black; organic pigments such as phthalocyanine blue, phthalocyanine green, quinacridone red pigment and isoindolenone yellow pigment; extender pigments such as talc, silica and calcium carbonate; metal powders such as aluminum powder and stainless steel powder; mica powder; and the like. Also it is preferable that a rust inhibiting pigment represented by pyrophosphoric acid or tripolyphosphate is blended.

The thermosetting fluorine-containing resin powder coating composition can be prepared by dry-blending each component, melt-kneading and pulverizing in the same manner as in known preparation method of thermosetting powder coating compositions. As case demands, the third components to be blended may be previously mixed to the resin component and curing agent. An average particle size of the thermosetting fluorine-containing resin powder coating composition is usually not more than 400 μm.

Examples of metallic substrate which can be inhibited from rusting by the method of the present invention are substrates of iron, aluminum, stainless steel, copper, zinc, alloys thereof such as stainless steel and brass, and the like.

The coating can be carried out, for example, with a commercially available electrostatic coating machine or fluidized bed coating machine. After coating uniformly, a coating film is formed by baking with a hot air oven, infrared ray oven, induction heater, or the like.

The metallic substrate may be previously coated with a primer. However according to the present invention, a sufficient rust preventing effect can be obtained by coating the above-mentioned thermosetting fluorine-containing resin powder coating composition directly to the metallic substrate without forming a primer.

From the viewpoint of adhesion and a rust preventing effect, it is preferable that the metallic substrate is previously subjected to treatments such as washing with water, degreasing, rust removal, surface preparation and chemical conversion.

Degreasing is carried out by alkali cleaning by dipping in sodium silicate, sodium phosphate or caustic soda or spraying thereof. Rust removing treatment is carried out by a method of spraying a blasting material such as alumina, silicon carbide, iron powder or glass onto a substrate at high speed. Surface preparation is carried out by dipping into an aqueous solution of surface modifier or spraying thereof. Chemical conversion treatment is carried out preferably by dipping in zinc phosphate, iron phosphate, chromate, chromic acid or phosphate chromate or spraying thereof.

The present invention is then explained concretely by means of examples and preparation examples, but the present invention is not limited to them.

PREPARATION EXAMPLE 1

A 3,000 ml stainless steel autoclave was charged with 1,020 g of butyl acetate, 265 g of cyclohexyl vinyl ether, 36 g of isobutyl vinyl ether, 72 g of 4-hydroxybutyl vinyl ether and 39.2 g of octanoyl peroxide, and the autoclave was cooled to 0° C. Then pressure reduction and replacement with nitrogen were repeated three times. Finally the pressure was reduced again and 300 g of tetrafluoroethylene was introduced. The autoclave was heated up to 65°°C. with stirring and the mixture was reacted at that temperature for 20 hours. When the inside pressure of the autoclave was lowered from 18 kg/cm$^2$G to 3 kg/cm$^2$G, the autoclave was cooled to room temperature, un-reacted monomer was released and the autoclave was opened to terminate the reaction. Then the autoclave was heated to 60°°C. and a dispersing medium was removed under reduced pressure of 1 mmHg over 24 hours to give a thermosetting fluorine-containing copolymer. Yield of the polymerization was 93%. According to $^{19}$F-NMR, $^1$H-NMR and elemental analyses, the obtained fluorine-containing copolymer was a copolymer comprising 49% by mole of tetrafluoroethylene, 34% by mole of cyclohexyl vinyl ether, 6% by mole of isobutyl vinyl ether and 11% by mole of 4-hydroxybutyl vinyl ether. A glass transition temperature thereof was 46°°C., and a MFR measured at 140°°C. was 79 g/10 min.

The thermosetting fluorine-containing copolymer was pulverized with an impact hammer mill to give a thermosetting fluorine-containing resin powder (A-1).

PREPARATION EXAMPLE 2

After a 4,000 ml stainless steel autoclave was charged with 760 g of de-ionized water and 7 g of potassium carbonate, an increase in a pressure with pressurized nitrogen and deairing were repeated three times to remove dissolved oxygen. Then the autoclave was charged with 572 g of chlorofluoroethane (HCFC141b), 340 g of hexafluoropropylene and 3 g of 4-hydroxybutyl vinyl ether under reduced pressure and a temperature thereof was adjusted to 35°°C. Further after adjusting the pressure of the autoclave to 9 kg/cm$^2$G with a monomer mixture comprising tetrafluoroethylene/ethylene in a ratio of 82/18% by mole, 4 g of cyclohexane and 24 g of 25% isobutyryl peroxide solution of flon 225 were introduced to initiate a reaction. With advance of the reaction, since a pressure reduction arose, a monomer mixture of tetrafluoroethylene/ethylene/hexafluoropropylene of 45/39/16% by mole ratio was supplied continuously to maintain the pressure of the autoclave at 9 kg/cm$^2$G. The reaction was carried out for 12 hours while adding 1.5 g of 4-hydroxybutyl vinyl ether and 12 g of 25% isobutyryl peroxide solution of flon 225 every six hours. A temperature and pressure inside the autoclave were decreased to ordinary temperature and atmospheric pressure, respectively to terminate the reaction. The obtained solid was washed and dried to provide 152 g of a white powder (A-2) of thermosetting fluorine-containing copolymer. According to $^{19}$F-NMR, $^1$H-NMR and elemental analyses, the obtained fluorine-containing copolymer was a copolymer comprising 34% by mole of tetrafluoroethylene, 47% by mole of ethylene, 12% by mole of hexafluoropropylene and 7% by mole of 4-hydroxybutyl vinyl ether. A glass transition temperature thereof was 48°°C., and a MFR measured at 140°°C. was 56 g/10 min.

COMPARATIVE PREPARATION EXAMPLE 1

A 3,000 ml pressure resistant stainless steel reactor equipped with a stirrer was charged with 1,000 g of t-butanol, 106 g of cyclohexyl vinyl ether (c-HxVE), 60 g of isobutyl vinyl ether (iso-BVE), 165 g of 4-hydroxybutyl vinyl ether (HBVE), 5 g of potassium carbonate and 0.5 g of azobisisobutyronitrile (AIBN), and dissolved oxygen was removed through solid deaeration by using liquid nitrogen. Then 330 g of chlorotrifluoroethylene (CTFE) was introduced, and the reactor was heated up slowly. While the temperature in the reactor was maintained at 65° C., the reaction was continued with stirring and 10 hours after, the reactor was water-cooled to terminate the reaction. After the reactor was cooled to room temperature, un-reacted monomer was released and the reaction was terminated. Then the reactor was heated to 60° C. and a dispersing medium was removed under reduced pressure of 1 mmHg over 24 hours to give a thermosetting fluorine-containing copolymer.

According to $^{19}$F-NMR, $^1$H-NMR and elemental analyses, the obtained fluorine-containing copolymer was a copolymer comprising 49% by mole of chlorotrifluoroethylene, 26% by mole of cyclohexyl vinyl ether, 9% by mole of isobutyl vinyl ether and 16% by mole of 4-hydroxybutyl vinyl ether. A glass transition temperature thereof was 43° C., and a MFR measured at 140° C. was 12 g/10 min.

The thermosetting fluorine-containing copolymer containing chlorine was pulverized with an impact hammer mill to give a thermosetting fluorine-containing resin powder (A-3).

PREPARATION EXAMPLE 3

A thermosetting fluorine-containing copolymer of Preparation Example 3 was prepared in the same manner as in Preparation Example 1 except that cyclohexyl vinyl ether was used instead of isobutyl vinyl ether. Yield of polymerization was 92%. A proportion of tetrafluoroethylene/cyclohexyl vinyl ether/4-hydroxybutyl vinyl ether was 48/50/12% by mole. A glass transition temperature thereof was 39° C., and a MFR measured at 140°°C. was 82 g/10 min.

The thermosetting fluorine-containing copolymer containing chlorine was pulverized with an impact hammer mill to give a thermosetting fluorine-containing resin powder (A-4).

EXAMPLE 1

73.3 Parts of the thermosetting fluorine-containing resin powder (A-1) prepared in Preparation Example 1, 25.8 parts of a curing agent ($\epsilon$-caprolactam-blocked isocyanate, B-1530 available from Hüfls Co., Ltd.) and 0.5 part of a leveling agent (MODAFLOW available from Monsanto Chemical Co., Ltd.) were dry-blended for three minutes with a Henschel mixer (available from Kabushiki Kaisha Aikosha Seisakusho). Then the mixture was melt-kneaded at 125°°C. with a twin-screw meltk-neader (16 mm twin extruder available from Prism Co., Ltd.), and after cooling, pulverized at room temperature for three minutes with a universal pulverizer (available from IKA Co., Ltd.). The obtained powder was classified with a 200 mesh screen to give a thermosetting fluorine-containing resin powder coating composition.

In the above-mentioned process, yield of classification was obtained by the following equation from a weight (A) of powder coating composition obtained by the classification and a weight (B) of melt-kneaded composition put in the pulverizer.

Yield of classification (%)=(A)/(B)×100

The yield of classification can be used as an index of productivity of the powder coating composition. Namely if the yield of classification is not good, a loss of powder coating composition increases during production process and productivity is lowered.

The powder coating composition was coated on a 150× 75×1 mm steel plate subjected to zinc phosphate treatment at an applied voltage of 40 kV by using a corona discharge type powder coating gun (GX3300 available from Onoda Cement Kabushiki Kaisha), and immediately baking was carried out at 200°°C. for 20 minutes to give a coated plate for testing. The following tests were carried out by using the coated plate. The results are shown in Table 1.

Thickness of Cured Coating Film:

A thickness is measured with an eddy-current instrument EL10D for measuring thickness (available from Kabushiki Kaisha Sanko Denshi Kenkyusho).

Gloss:

An angle of reflection at an incident angle of 60 degrees is measured according to JIS K 5400.

Weather Resistance:

After an accelerated weather resistance test is carried out for 1,000 hours with I-SUPER UV tester Model W-13 (Light/Dew/Rest=11/11/1 HR is assumed to be one cycle) available from Iwasaki Electric Co., Ltd., with respect to a coated plate of a white coating (containing a pigment), a gloss retention (a ratio of gloss after the test to initial gloss) is measured and a color difference ($\Delta E$) before and after the test is measured with a colorimeter (CR300 available from Minolta Co., Ltd.). Further a change in appearance of a coating film after the test is evaluated with naked eyes.

With respect to a clear coating containing no pigment, a change of a coated plate before and after the test is observed with naked eyes, and evaluated by the following criteria.

A: No change is found on the surfaces of coating film and substrate at all.

B: A slight color change is found on a coating film, but no change is found on a surface of substrate at all.

C: No color change is found on a coating film, but rusting is found on a surface of substrate.

D: A color change on a coating film and rusting on a surface of substrate are found.

EXAMPLES 2 to 6 and COMPARATIVE EXAMPLES 1 to 3

Thermosetting fluorine-containing resin powder coating compositions having components shown in Table 1 were prepared in the same manner as in Example 1, and coated in the same manner as in Example 1. Various tests were carried out. The results are shown in Table 1.

A pigment for white coating which was blended in Examples 4 and 5 and Comparative Example 3 was titanium dioxide. A stainless steel substrate used in Examples 2, 3 and 6 and Comparative Example 2 was SUS304 subjected to chromate phosphate treatment. An aluminum substrate used in Examples 4 and 5 and Comparative Example 3 was an aluminum plate subjected to A714 chemical conversion treatment according to JIS 2003.

TABLE 1

| | Example | | | | | | Comparative Example | | |
|---|---|---|---|---|---|---|---|---|---|
| | 1 | 2 | 3 | 4 | 5 | 6 | 1 | 2 | 3 |
| Components of powder coating composition (parts by weight) | | | | | | | | | |
| Fluorine-containing resin | A-1 | A-1 | A-2 | A-1 | A-2 | A-4 | A-3 | A-3 | A-3 |
| Amount | 73.7 | 7.37 | 73.6 | 51.5 | 55.5 | 73.7 | 62.0 | 62.0 | 43.5 |
| Curing agent | 25.8 | 25.8 | 19.9 | 18.0 | 14.0 | 25.8 | 37.5 | 37.5 | 26.0 |
| Flowability control agent | 0.5 | 0.5 | 0.5 | 0.5 | 0.5 | 0.5 | 0.5 | 0.5 | 0.5 |
| Pigment | 0 | 0 | 0 | 30 | 30 | 0 | 0 | 0 | 30 |
| Substrate | Steel plate | SUS plate | SUS plate | Aluminum plate | Aluminum plate | SUS plate | Steel plate | SUS plate | Aluminum plate |
| Yield of classification (%) | 98 | 98 | 99 | 98 | 99 | 64 | 75 | 75 | 77 |
| Characteristics of coating film | | | | | | | | | |
| Coating thickness ($\mu$m) | 40 | 40 | 40 | 70 | 70 | 40 | 40 | 40 | 70 |
| Gloss | — | — | — | 76 | 65 | — | — | — | 79 |

TABLE 1-continued

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Weather resistance | | | | | | | | | |
| Gloss retention (%) | — | — | — | 96 | 99 | — | — | — | 98 |
| Color difference (ΔE) | — | — | — | 1.2 | 0.8 | — | — | — | — |
| Change in appearance | A | A | A | A | A | A | D | D | D |

As it is clear from Table 1, in Comparative Examples 1 and 2 in which the fluorine-containing resin powder coating composition containing chlorine was used, there was no change in a gloss on a surface of a coating film, but there was yellowing on the coating film and further dot-like red rusting was recognized at an interface between the coating film and the metallic substrate. In Comparative Example 3 in which the white fluorine-containing resin powder coating composition containing chlorine was used, the results of a change in a gloss and color difference after the weather resistance test were good, but there was blistering on the coated plate after the test. The blistered portion was cut with a knife and observed with naked eyes and it was found that the blistering was caused due to filiform white rusting of the aluminum substrate.

INDUSTRIAL APPLICABILITY

According to the method of the present invention, rusting of a metallic substrate can be prevented effectively. The method of the present invention is effective particularly for coating in a coasting area adjacent to a seashore where there is a problem with a salt damage, in an outdoor area where there is a damage due to an acid rain and further in a kitchen.

What is claimed is:

1. A method of inhibiting rusting of a metallic substrate by coating the metallic substrate with a thermosetting fluorine-containing resin powder coating composition which has a glass transition temperature of from 45° to 120°°C. and does not contain essentially chlorine atom.

2. The method of claim 1, wherein the fluorine-containing resin is a copolymer comprising, as essential components, a perfluoroolefin and a vinyl ether and/or vinyl ester with no chlorine atom.

3. The method of claim 2, wherein the perfluoroolefin is tetrafluoroethylene and/or hexafluoropropylene.

4. The method of claim 1, wherein the thermosetting fluorine-containing resin powder coating composition which does not contain essentially chlorine atom is coated directly on the metallic substrate without forming a primer.

5. The method of claim 1, wherein the substrate is an aluminum plate, a stainless steel plate or a steel plate.

* * * * *